Nov. 16, 1943.       B. BOYSEN       2,334,600
CAPSULE
Filed March 20, 1941
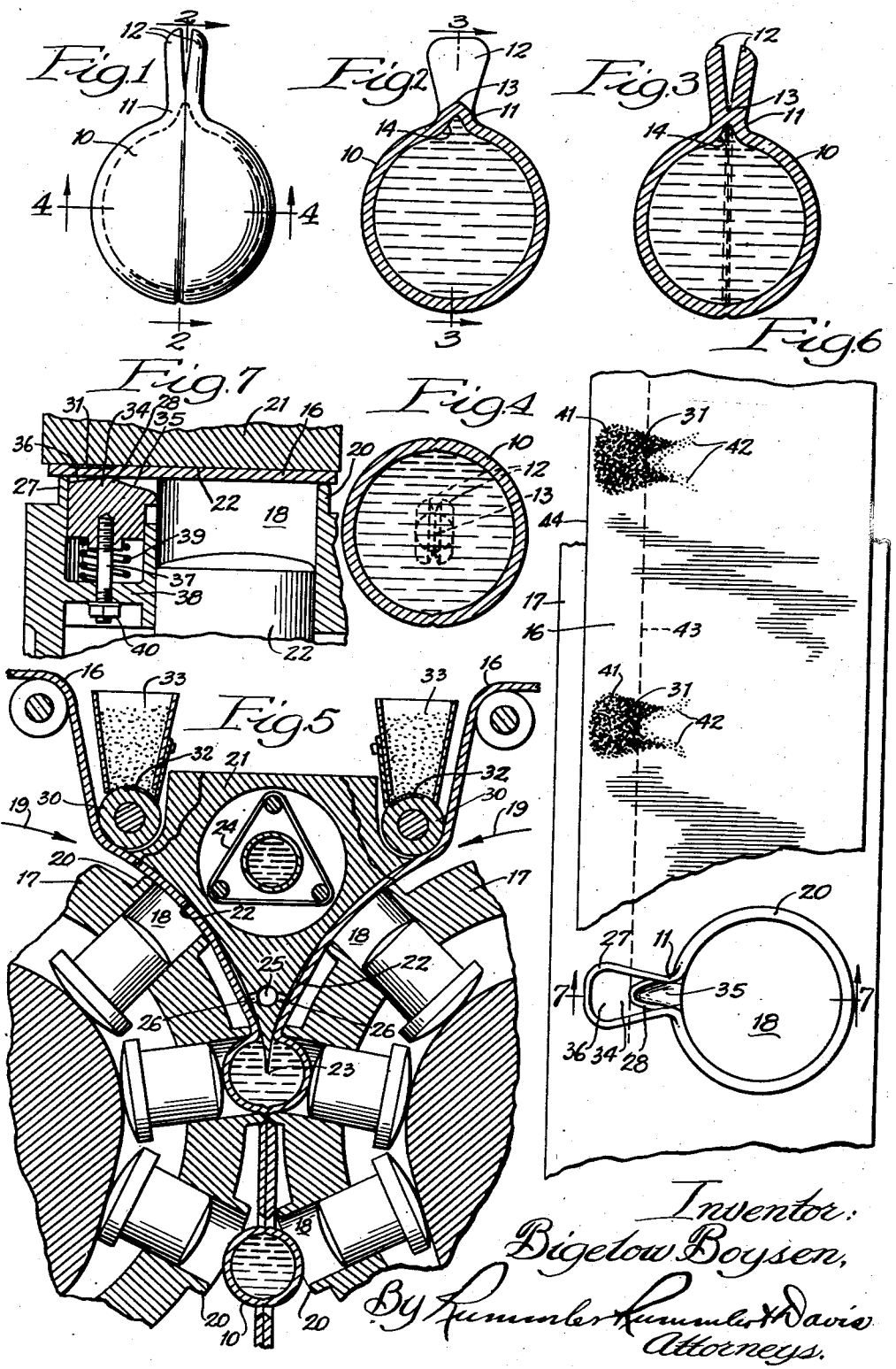
Inventor:
Bigelow Boysen,
By Kummler Kummler & Davis
Attorneys.

Patented Nov. 16, 1943

2,334,600

UNITED STATES PATENT OFFICE 2,334,600

CAPSULE

Bigelow Boysen, Chicago, Ill.

Application March 20, 1941, Serial No. 384,368

3 Claims. (Cl. 206—56)

This invention relates to capsules or containers for unit dose quantities of liquid, or semi-liquid substances, especially adapted for holding such substances safely enclosed and arranged for convenient opening of the capsule when its contents are to be used.

The main objects of this invention are to provide an improved construction for capsules, especially such as are made of gelatinous material and having improved means for opening the same; to provide such improved form of capsule that it will have a normally sealed discharge mouth provided with lips that can be readily pulled apart for controlling the opening of the capsule or stripping it from its contents.

A further object is to provide an improved construction for capsules of gelatinous or other grainless material; such that will facilitate their being torn open and arranged so that the walls of the capsule will be sure to tear on a predetermined line of severance.

A specific embodiment of this invention is shown in the accompanying drawing, in which:

Figure 1 is an elevation of a capsule of improved form.

Fig. 2 is a section taken on the line 2—2 of Fig. 1.

Fig. 3 is a section on the line 3—3 of Fig. 2.

Fig. 4 is a section on the line 4—4 of Fig. 1.

Fig. 5 is a sectional view showing somewhat diagrammatically certain features of a capsule-making machine that would be capable of making capsules out of gelatin and in accordance with this invention.

Fig. 6 is a detail showing a face view of the capsule-forming die in its relation to the strip of gelatin from which the capsules are formed and showing an arrangement of non-adhesive areas on the surface of the strip which provides for the proper separation of lips of the finished capsule.

Fig. 7 is a sectional detail of the capsule forming die taken on the line 7—7 of Fig. 6.

In the form shown the capsule comprises a globular or bulbous body 10 having at one side a neck-like protuberance 11 terminating in a pair of wing-like lips 12 at opposite sides of the plane represented by the line 2—2 of Fig. 1, which is the plane of the line of juncture on which the walls of the two halves of the capsule shell are united in forming the capsule.

The neck 11 is preferably tapered to a point at its outer end so as to form an outwardly projecting or bowed closure or mouth 13 with neck walls 14 which converge toward the central part of said mouth. The lips 12, as will be seen from Fig. 2, are shaped so that when pulled apart they will cause the mouth to commence to tear open at the point 13 and to gradually spread to larger dimensions as the lips are pulled apart. In this way it is assured that the initial opening of the mouth will be very small and that it can be enlarged at will to suit any desired rate of discharge of the contents when the side walls of the bulbous body 10 are squeezed together.

An appropriate form of mechanism for forming capsules in accordance with this invention is illustrated in Fig. 5 and comprises means for bringing together a pair of webs 16 of gelatin over the peripheries of a pair of forming rollers 17, each having an annular series of capsule-forming dies 18 in its periphery so that opposed pairs of these dies will come into registering positions as these capsule-forming rollers rotate in the direction of the arrows 19. Each of the dies 18 has an upstanding rim 20 which is of appropriate outline to form a capsule of the desired shape, as the respective die rims 20 roll one upon the other.

The die-forming rollers 17 are geared together so they rotate in unison in opposite directions about their respective centers and in the direction of the arrows 19.

Positioned in the troughlike space above and between the peripheries of the rollers 17 is a wedge-shaped filler member 21 which has converging side walls 22 cylindrically curved so as to stand concentric with the peripheries of the forming rollers 17 and meeting in a sharp edge 23. The filler member is mounted to yield vertically to suit the thickness of the webs of gelatin. The filler member 21 has a heating coil 24 housed within it whereby the film or web of gelatinous material may be kept at the proper temperature for the forming and coalescent sealing operations and it is also provided with a supply duct 25 having outlets 26 through which the fluid or semi-fluid contents of the capsules are supplied thereto during the forming operation.

Each of the dies 18 is provided with a rim 20 which throughout its outer contour has its crest lying generally in a cylindrical surface so that when any one of these dies is opposed to the surface 22 of the filler member, this crest will hold the web 16 of gelatin in fluid-tight engagement with the surface 22 of the filler member especially throughout that part of the travel of the die during which it is opposed to the filler inlets 26.

All of that part of the rim 20 which defines the shape of the capsule and its lip extensions lies at all times exactly in the geometrical surface of a cylinder concentric to the axis of the die roller so that when the dies 18 roll past the line of tangency between the rollers 17, they will roll in registering contact with each other and sever the interposed films of gelatin.

The die rim 27 which defines the contour of the lips may be narrower than the die rim 20 since it merely performs a cutting operation; whereas the die rim 20 has a rounded or beveled crest so that it will perform both the operations of cutting out and sealing the capsule walls.

Each of the dies, in addition to the crests 20 and 27, has a dam-like crest member 28 that spans the neck of the capsule and normally holds the web of gelatin in fluid tight engagement with the surface 22 during the filling operation, but is spring pressed as to yield inwardly of the geometrical surface of the cutting edges of the crests 20 and 27 so that it will exert pressure enough to perform the sealing operation between the two halves of the capsule at the point where its discharge mouth is formed but will not sever nor substantially weaken the walls of gelatin.

In order to prevent the lips 12 from adhering to each other throughout the area beyond the mouth 13, their opposed surfaces are rendered non-adhesive by being appropriately coated with a non-adhesive substance.

This coating of non-adhesive material may be supplied to the webs of gelatin by mechanism in the nature of printing rollers 30 which apply appropriately located areas of non-adhesive material 31 to the film 16 in proper location to register with the space defined by die rim 27 which forms the lips 12.

If dry powder or paste is used for making these imprints 31, the printing mechanism may be of the form shown in Fig. 5 in which the roller 30 has a depressed surface area 32 to receive the powder or paste from a suitably arranged supply device such as the magazine or fountain 33.

In order to prevent the lip portions of the capsules from being drawn across the filler outlets 26, the lip forming die members are preferably placed at one side of said openings, as shown in Fig. 6, and it will accordingly be understood from Fig. 5 that the printing devices 30 which supply the adhesion preventing substance to the web of gelatin are located in the plane of movement of that part of the die. The crest of the lip cutting rib 27 forms a continuation of the crest of the die rim 20; that is, it lies in the same cylindrical surface therewith. The dam member 28 which closes the mouth 13 at the end of the neck 11 of the capsule is in the form of a plunger having a head 34 which has a crest 28 that determines the shape of the end of the neck of the capsule with a cavity 35 facing the cavity of the die 18 and merging therewith to determine the shape of the neck of the capsule, and the opposite side portion 36 of said head 34 is relieved so as to avoid sealing pressure on the lips when they pass the point of tangency where the die crests meet.

The plunger head 34 is carried by a shank 37 which extends through an abutment 38 in the rim of the die roller 17 and is normally urged by a spring 39 into engagement with the gelatin web. A limit stop for this outward movement may be a nut 40 on the shank 37. The pressure of the spring 39 is sufficient to withstand the filling pressure of the liquid as it enters and inflates the capsule, but is such that it will allow the heads 34 to yield so as to prevent cutting of the film of gelatin by the dam crest 28.

It will be understood that the powder or paste that forms the non-adhesive areas on the lips may vary in density from the lip margins toward the mouth as indicated by stippling of the areas 31 in Fig. 6. This is controlled by variations in the depth or surface character of the areas 32 of the printing roller 30 just as the intensity of ink impressions are controlled in a printing press. As indicated in Fig. 6, enough powder is applied to the areas 41 that form the free surfaces of the lips 12 to completely prevent cohesion between the lips while at the margins 42 of the imprints 31 which form the mouth 13 of the capsule, the powder is thinned out or diffused so as to permit sealing of the mouth but to weaken the joint enough to insure that amorphous shell material will tear on the desired plane of severance at the mouth when the lips are pulled apart.

Instead of using powder or paste as hereinbefore-described the separation of the lips 12 might be accomplished by applying a strip of paper or the like to the face of one of the webs in such manner that it will separate the lips during the operation of cutting them from the webs of gelatinous material. For example, a narrow web of paper might be fed into the machine so as to lie between the edge 44 of the web of gelatinous material and the dotted line 43 of Fig. 6 and stripping off this web of paper after the forming operation.

The finished capsule will have the form illustrated in Figs. 1, 2 and 3 and due to the non-adhesive nature of the opposite surfaces of the lips 12, these may be readily pulled apart causing the shell of the capsule to tear open at the mouth 13, which can be enlarged to any desired extent, or the two parts of the capsule may be pulled completely apart by means of these lips.

The term "gelatinous material," as herein used in the specification and claims, is intended to include any appropriate amorphous coalescent plastic substance for forming capsule walls in accordance with the herein-described procedure.

Many of the commodities that could be appropriately packed into lipped capsules of the type herein-described contained water or other solvents and it is, therefore, to be understood that the expression "gelatinous material" is intended to cover any appropriate substance that could be used for forming the capsules of shell sections integrated into one piece without requiring adhesive bonding substances provided that it is neither dissolved by such solvents nor has a detrimental influence on the contents.

It will be understood that numerous details of the structure of the capsule and the machine and the method of making the same may be altered or omitted without departing from the spirit of this invention, as defined by the following claims.

I claim:

1. A capsule comprising a pair of shell sections of plastic material coalesced with each other at their margins, a pair of lips formed by registering opposed marginal extensions on said sections, and diffused elements interposed between the margins of said sections adjacent said lips to locally weaken the coalescence of the sections and define a plane of cleavage between said lips and into the interior of the capsule.

2. A capsule comprising a hollow shell formed of sections of gelatinous material integrated in edge-to-edge abutting relation and having a neck projecting therefrom, said neck having a sealed mouth having marginal lip extensions for opening said mouth, said mouth being outwardly convex, and said lips being extended downward along said neck beyond said mouth to localize the tearing of said shell to open said mouth from its center outwardly, and means interposed between said marginal lip portions to preclude their adhering to each other, said means comprising diffused elements disposed within the sealed part of said mouth to weaken the bonding thereof and give direction to the severage of the material at said mouth.

3. A capsule comprising a bulbous shell of plastic material, having a pair of lips forming a sealed mouth, said lips having separable marginal portions adapted to be pulled apart to open said mouth, and means interposed between said marginal lip portions to preclude their adhering to each other, said means comprising diffused elements disposed within the sealed part of said mouth to weaken the bonding thereof and give direction to the severance of the material at said mouth.

BIGELOW BOYSEN.